Jan. 13, 1948. J. MULLER 2,434,425
APPARATUS FOR THE GAUGING OF LIQUIDS
Filed Aug. 13, 1936 2 Sheets—Sheet 1

Inventor:
JACQUES MULLER
By Bönnelycke, Young, Emery & Thompson
attys.

Jan. 13, 1948. J. MULLER 2,434,425
APPARATUS FOR THE GAUGING OF LIQUIDS
Filed Aug. 13, 1936 2 Sheets-Sheet 2
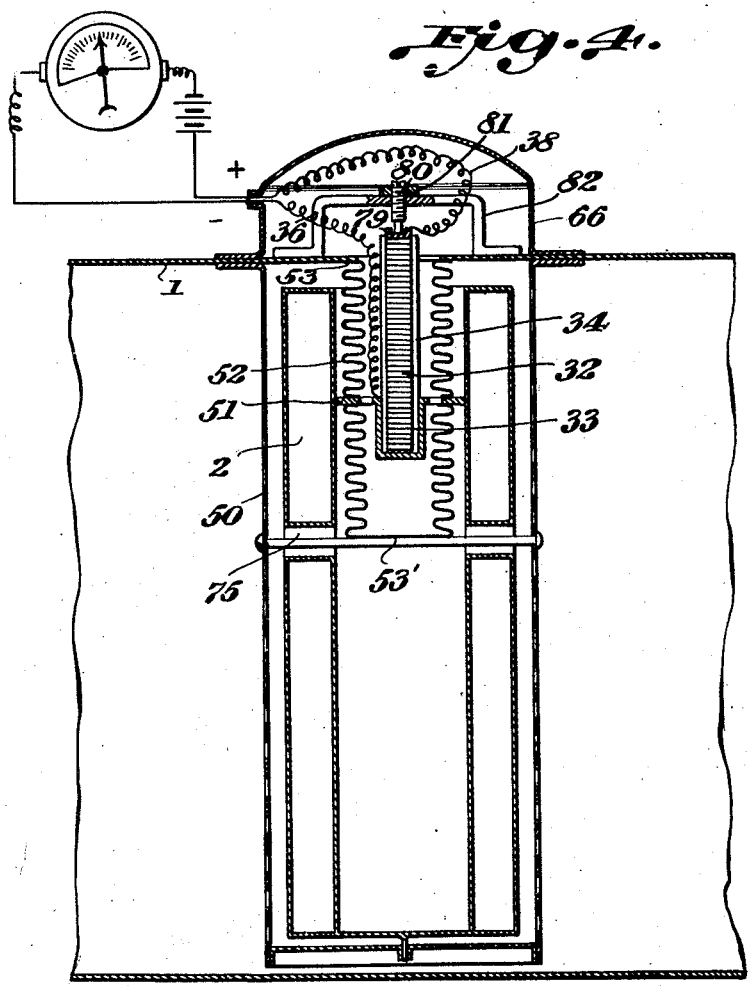
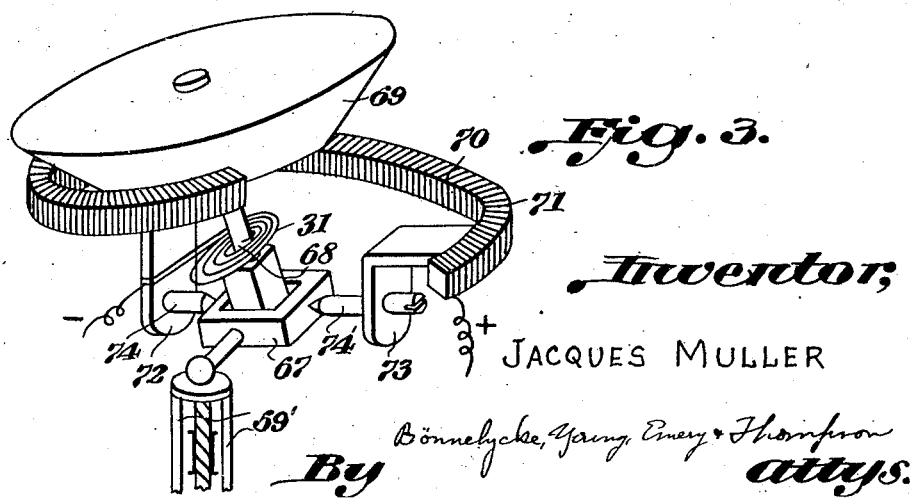
Inventor,
JACQUES MULLER Patented Jan. 13, 1948

2,434,425

UNITED STATES PATENT OFFICE 2,434,425

APPARATUS FOR THE GAUGING OF LIQUIDS

Jacques Muller, La Garenne-Colombes, France

Application August 13, 1936, Serial No. 95,942
In France August 30, 1935

Section 3, Public Law 690, August 8, 1946
Patent expires August 30, 1955

7 Claims. (Cl. 73—309)

This invention relates to the gauging of liquid levels in tanks wherein the variations in buoyancy of a body immersible in the liquid are transmitted to a deformable bellows and thence to an indicator.

According to the present invention, the immersible body is mechanically connected to a single box bellows at about the middle of the bellows and the ends of the bellows are fixed to the tank containing the said body, the movements of the middle of the bellows, or that part of the bellows at about the middle thereof, being electrically transmitted to an indicator.

In fixing the ends of such a bellows with respect to the tank containing the said immersible body and the liquid, there is obtained an arrangement which is responsive only to the thrust of the immersible body and which neutralizes all other thrusts created by variations of pressure.

The employment of a single deformable bellows permits, on the one hand, in rendering it fluid-tight with respect to the liquid of the tank utilizing its interior for locating there the transmission member for the deformation of the bellows to the indicating system. It is thus possible in this case to employ electrical apparatus with a hydrocarbon liquid, for example, without fear of the contact of this latter or of its vapors with a spark or with heat always possible with this apparatus.

Figure 1:
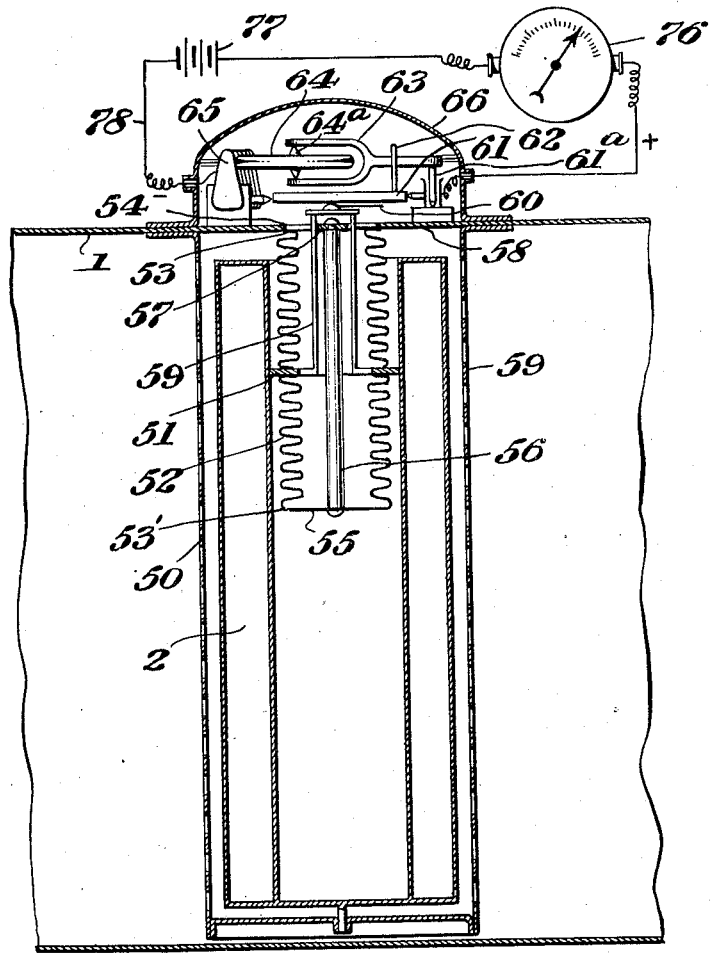
Figure 2:
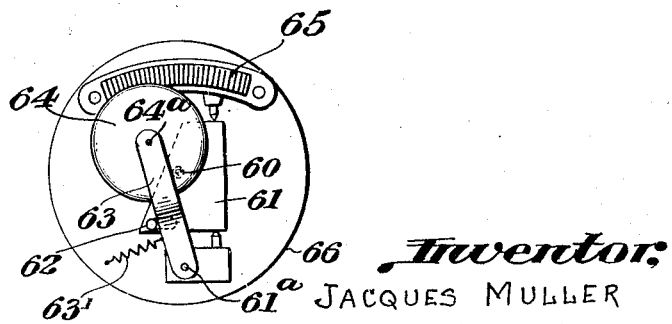

By way of example of realization of liquid gauges with electrical transmission to a distance, the accompanying drawings show in:

Figure 1 a measuring device employing a rheostat apparatus;

Fig. 2 a plan view of the apparatus illustrated in Fig. 1, the cover being removed;

Fig. 3 a modification of Fig. 1; and

Fig. 4 a measuring device utilizing variations of current passing in superposed washers which become more or less conducting according to the pressure applied to them.

In these examples, the transmission produced is fluid-tight and insensitive to variations of pressure, without possible contact between the transmitting system and the liquid. This is owing to the deformable wall of the single box which, although yielding and expanding according to the variations of buoyancy of the immersible body, counterbalances the thrust thereof and which by its fluid-tightness makes mechanical transmission elements having stuffing boxes or other pressure elements unnecessary, stuffing boxes or the like having an influence on the precision of the measurements.

In the drawings, the same references indicate the same parts.

The features of the electrical measuring devices used, which eliminate any deleterious friction to the precision of the indications are, preferably, the following:

In the first system there is varied in a horizontal plane the position of a cage carrying a roller which moves by rolling on an electrical resistance. In a second system a truncated cone is caused to oscillate in permanent contact with its lateral surface on an electrical resistance in the form of a left hand cam of such profile that it rolls thereon without friction. In a third system there is variation in the pressure upon a pile of graphite or other washers sensitive to pressure which effects a change in resistance.

In Figs. 1 and 2, the body 2 immersed partially in the liquid of the tank 1 is located in a chamber or guide 50 which serves to guide it and to break the eddy of the liquid. This body is connected by a sheath 51 to the lateral deformable part of an elastic and fluid tight chamber or bellows 52. The upper part 53 of the bellows 52 is connected at 54 to the tank 1 and the lower end 53' of the chamber 52 is formed by a plate 55, which with an axial rod 56 connects to the part 58 of the upper wall of the tank through its head 57.

The movement of the sheath 51 under the thrust of the body 2 is transmitted by rods 59, passing without friction and freely through the upper end 53 of the chamber or bellows 52, to a sperical pusher button 60 which, by means of the oscillating disc 61 and the rod 62 of suitable curvature, causes a cage 63, with an elastic return device 63' to turn around its pivot 61a. The cage carries a roller 64 which revolves around pivot points 64a without friction and rolls on an arcuate electrical resistance 65 secured to the tank 1. This is protected from the outer surroundings by a removable cover 66 which also protects the whole of the electrical equipment. The amount of displacement of the sheath 51 is indicated by the gauge 76 which is included in a circuit 78, together with the resistance 65 and the current generator 77.

In Fig. 3, which is actuated by a level responsive structure similar to that of Figs. 1 and 2, the pusher rods 59' with a flat head acts on a joint 67 carrying rigid thereon the oscillating shaft 68 of a truncated cone 69 of which the lateral face moves without friction on the track 70 of an electrical resistance 71 in the form of a left-hand spiral secured to the tank 1 by insulating bracket 72, 73 carrying adjustable pivots 74, 74' of one of the axes of the joint 67. A spring 31 tends constantly to urge the truncated cone 69 against the upper portion on the resistance 71. Shaft 68 is pivoted about an axis at right angles to the pivots 74, 74'.

In an arrangement of this type the radii of the points of contact between the cone and the track of the resistance are rigourously equal but vary at each point in question.

In Fig. 4 the connection 51 between the immersible body 2 and the bellows 52 is provided with a central hole. The closed lower end 53' of the bellows 52 is connected to the side of guide 50 and the latter to the wall of tank 1 at the opening 53. The immersible body 2 is provided with openings 75 enabling the bellows 52 to be deformed freely at the point of connection 51 for transmitting the thrusts received by the central hole of the said connection or sheath 51 to a pile 32 of graphite washers simply superposed freely in the interior of a tubular insulating sheath 34.

The lower graphite washer 33 is connected electrically to a current terminal 36 and the upper graphite washer of the pile 32 is connected electrically to a second current terminal 38. A spring, not shown, may eventually impart the initial pressure to the graphite washers.

In an arrangement of this type there is utilised the phenomenon of the electrical resistance, variable according to the pressure load, for an electric current passing through the pile of graphite washers, the value of the intensity of the current being a function of the pressure exerted. This intensity is read off on a galvanometer or any other suitable measuring apparatus in a suitably graduated scale, in litres, for example.

A metal disc 79 is positioned on the top of the pile 32 and is provided with a recess in its upper surface adapted to receive the lower end of a screw 80. The screw 80 is threadedly mounted in a support 82 carried by the tank. It will be appreciated that by adjusting the position of the screw 80 in the support 82, the initial pressure on the pile 32 may be varied. A lock nut 81 serves to secure screw 80 in adjusted positions.

In the arrangements in Figs. 1 to 4 the intensity of the current between the terminals is measured in any known and suitable manner and it is converted on a dial into an arbitrary scale. It is also possible to measure other variables of the current by known electro-technical methods.

I claim:

1. An apparatus for gauging liquids in a reservoir, comprising an immersible body in said reservoir, a bellows in said reservoir having one end open and secured to the upper wall of the reservoir, a vertical rod extending through the bellows for rigidly affixing the other end to the upper wall of the reservoir, means connecting the immersible body to the movable portion of said bellows intermediate the fixed ends thereof, rods connected to the intermediate movable portion of the bellows on the interior of the latter and extending up through the bellows and an opening in the upper wall of the reservoir surrounded by the bellows, a variable electric resistance mounted on the exterior of said reservoir, means actuated by said rods connected to the movable portion of the bellows for varying said resistance, and electric indicating means associated with said resistance.

2. An apparatus for gauging liquids in a reservoir, comprising an immersible body in said reservoir, a bellows in said reservoir having one end open and secured to the upper wall of the reservoir, a vertical rod extending through the bellows for rigidly affixing the other end to the upper wall of the reservoir, means connecting the immersible body to the movable portion of said bellows intermediate the fixed ends thereof, rods connected to the intermediate movable portion of the bellows on the interior of the latter and extending up through the bellows and an opening in the upper wall of the reservoir surrounded by the bellows, an electrical resistance coil mounted on the exterior of said reservoir, a swinging arm having a contact element engaging said coil and shiftable thereover, an oscillating member actuated by said rods and having an arm engaging the contact element carrying arm for shifting the latter, and electric indicating means associated with said resistance.

3. An apparatus for gauging liquids in a reservoir, comprising an immersible body in said reservoir, a bellows in said reservoir having one end open and secured to the upper wall of the reservoir, a vertical rod extending through the bellows for rigidly affixing the other end to the upper wall of the reservoir, means connecting the immersible body to the movable portion of said bellows intermediate the fixed ends thereof, rods connected to the intermediate movable portion of the bellows on the interior of the latter and extending up through the bellows and an opening in the upper wall of the reservoir surrounded by the bellows, a universal joint having an intermediate member engaging said rods to be shifted thereby about one axis of said universal joint, a frusto-conical member, means supporting said frusto-conical member for rotation about the axis of the frusto-conical member, said supporting means being pivotally carried by the intermediate member of said universal joint, a helical resistance element on which said frusto-conical member engages, resilient means urging said frusto-conical member into engagement with said resistance element, and electric indicating means associated with said resistance.

4. An apparatus for gauging liquids in a reservoir, comprising an immersible body in said reservoir, a bellows in said reservoir having one end open and secured to the wall of the reservoir, a perforated sleeve surrounding the immersible body and fixed to the reservoir, means for fixing the other end of said bellows to said sleeve, means connecting the immersible body to the intermediate movable portion of said bellows, means carried by the interior intermediate portion of said bellows for supporting a pile of carbon plates, a terminal plate at the bottom of said pile, a terminal plate at the top of said pile, means carried by the wall of the reservoir for engaging the upper terminal plate, whereby variations in the position of the intermediate portion of the bellows will vary the pressure between the carbon plates of said pile, and electric indicating means associated with said carbon pile.

5. An apparatus for gauging liquids in a reservoir, comprising an immersible body in said reservoir, a bellows in said reservoir having one end open and secured to the wall of the reservoir, a perforated sleeve surrounding the immersible body and fixed to the reservoir, means for fixing the other end of said bellows to said sleeve, means connecting the immersible body to the intermediate movable portion of said bellows, means carried by the interior intermediate portion of said bellows for supporting a pile of carbon plates, a terminal plate at the bottom of said pile, a terminal plate at the top of said pile, means carried by the wall of the reservoir for engaging the upper terminal plate, whereby variations in the position of the intermediate portion of the bellows will vary the pressure between the carbon plates of said pile, means for regulating the initial pressure on the pile, and electric indicating means associated with said carbon pile.

6. An apparatus for gauging liquid in a reservoir, comprising an immersible floating body in said liquid, a bellows positioned coaxially of the immersible body and provided with an open end and a closed end, the open end of the bellows being fixed to the upper wall of the reservoir and surrounding an opening in said wall, means for fixing the closed end of the bellows to said upper wall, means connecting the intermediate portion of the bellows to the immersible body, electric measuring means exterior of said tank, and means extending from the exterior of said tank into said bellows and connected to the intermediate portion of the bellows for actuating the measuring means.

7. An apparatus for gauging liquid in a reservoir, comprising a tubular immersible floating body in the liquid, a bellows positioned concentrically within said immersible body and provided with an open end and a closed end, the open end of the bellows being fixed to the upper wall of the reservoir and surrounding an opening in said wall, means for fixing the closed end of the bellows to said upper wall, means connecting the intermediate portion of the bellows to the immersible body, and means connected to the intermediate portion of the bellows and extending through the opening in the wall of the reservoir for gauging the liquid in said reservoir.

JACQUES MULLER.

REFERENCES CITED

The following references are of record in the file of this patent:

UNITED STATES PATENTS

| Number | Name | Date |
|---|---|---|
| 1,159,609 | Sundh | Nov. 9, 1915 |
| 1,516,160 | Springer | Nov. 18, 1924 |
| 1,590,287 | De Giers | June 29, 1926 |
| 1,717,051 | Marshall | June 11, 1929 |
| 1,758,975 | Reeves | May 20, 1930 |
| 1,861,886 | Slough | June 7, 1932 |
| 1,875,803 | De Giers | Sept. 6, 1932 |
| 1,829,489 | Mularkey | Oct. 27, 1931 |
| 1,856,364 | Watson | May 3, 1932 |
| 1,881,264 | De Giers | Oct. 4, 1932 |
| 2,006,608 | Smulski | July 2, 1935 |

FOREIGN PATENTS

| Number | Country | Date |
|---|---|---|
| 658,308 | France | Jan. 25, 1929 |
| 443,578 | Great Britain | Mar. 2, 1936 |